(12) United States Patent
Rodriguez Serrano et al.

(10) Patent No.: US 11,789,176 B2
(45) Date of Patent: Oct. 17, 2023

(54) AERONAUTICAL COMPOSITE STRUCTURE AND METHOD AND SYSTEM FOR MONITORING THE PHYSICAL STATUS THEREOF

(71) Applicant: Airbus Operations S.L., Getafe (ES)

(72) Inventors: Jacinto Enrique Rodriguez Serrano, Getafe (ES); Carlos Miguel-Giraldo, Getafe (ES)

(73) Assignee: Airbus Operations S.L., Getafe (ES)

( * ) Notice: Subject to any disclaimer, the term of this patent is extended or adjusted under 35 U.S.C. 154(b) by 302 days.

(21) Appl. No.: 17/347,733

(22) Filed: Jun. 15, 2021

(65) Prior Publication Data
US 2021/0389496 A1 Dec. 16, 2021

(30) Foreign Application Priority Data
Jun. 15, 2020 (EP) .................................. 20382511

(51) Int. Cl.
*B64F 5/60* (2017.01)
*G01V 8/16* (2006.01)
*B64C 5/06* (2006.01)
*G02B 6/02* (2006.01)

(52) U.S. Cl.
CPC .................. *G01V 8/16* (2013.01); *B64C 5/06* (2013.01); *B64F 5/60* (2017.01); *G02B 6/02042* (2013.01)

(58) Field of Classification Search
CPC .... B64F 5/60; B64C 5/06; G01V 8/16; G02B 6/02042
See application file for complete search history.

(56) References Cited

U.S. PATENT DOCUMENTS

| | | | | |
|---|---|---|---|---|
| 5,250,802 A | * | 10/1993 | Runner | G01M 11/086 73/800 |
| 5,265,475 A | * | 11/1993 | Messinger | G01M 11/083 250/227.14 |
| 8,812,251 B2 | * | 8/2014 | Ihn | G01N 27/026 702/182 |
| 2004/0206893 A1 | * | 10/2004 | Sato | G01N 21/8806 250/227.14 |

(Continued)

FOREIGN PATENT DOCUMENTS

| | | | | |
|---|---|---|---|---|
| JP | 2001227994 A | * | 8/2001 | |
| WO | WO-2008131303 A2 | * | 10/2008 | ........... A61B 5/1076 |
| WO | WO-2019066800 A1 | * | 4/2019 | .............. F16B 31/02 |

OTHER PUBLICATIONS

European Search Report; priority document.

(Continued)

*Primary Examiner* — Jamel E Williams
(74) *Attorney, Agent, or Firm* — Greer, Burns & Crain, Ltd.

(57) ABSTRACT

An aeronautical composite structure configured to monitor a physical status of a bonded portion between structural components using a multi-core optical fiber. A method and system for monitoring the physical status of a bonded portion in an aeronautical composite structure also uses a multi-core optical fiber. More particularly, the invention relates to a structure and method for monitoring the physical status of a bonded portion of an aeronautical composite structure from its manufacturing to its use in flight using a multi-core optical fiber.

15 Claims, 6 Drawing Sheets

(56) References Cited

U.S. PATENT DOCUMENTS

2007/0286561 A1* 12/2007 Poland ............... G02B 6/02042
                                                              385/12
2009/0262779 A1* 10/2009 Andrejco ........... G01K 11/3206
                                                             264/1.24

OTHER PUBLICATIONS

Carlos de Miguel Giraldo, "Desarrollo de sensores de fibra optica para su aplicacion a la monitorizacion de la integridad estructural en estructuras aeronauticas de material compuesto" Polytechnic University of Madrid, School of Aeronautical and Space Engineering, Doctoral Thesis, 2018.
J. Pandher, et al., "Research Paper: In-Process and in-situ Monitoring of Process Parameter in Fusion Bonding of Thermoplastic Composites" Zeusinc.com.

* cited by examiner

AERONAUTICAL COMPOSITE STRUCTURE AND METHOD AND SYSTEM FOR MONITORING THE PHYSICAL STATUS THEREOF

CROSS-REFERENCES TO RELATED APPLICATIONS

This application claims the benefit of the European patent application No. 20382511.2 filed on Jun. 15, 2020, the entire disclosures of which are incorporated herein by way of reference.

FIELD OF THE INVENTION

The present invention is related to an aeronautical composite structure intended for monitoring the physical status of a bonded portion between structural components. The invention is also related to such a method and system for monitoring the physical status of a bonded portion in an aeronautical composite structure. More particularly, the invention relates to a structure and method for monitoring the physical status of a bonded portion of an aeronautical composite structure from its manufacturing to its use in flight.

BACKGROUND OF THE INVENTION

Aeronautical composite structures often integrate stiffeners, such as, for example, stringers to improve rigidness or buckling resistance in those composite structures. These stringers, as well as structural components of the mentioned composite structures, may be joined between them by adhesive lines. That is, this technical field of composite structure typically makes use of adhesive joints for composite structures during manufacture and assembly stages.

The adhesive joints usually follow a cure process, entering the composite structure within an autoclave, wherein temperature is one of the key parameters to be considered in the manufacturing of this kind of structure. Temperature in the autoclave is mostly controlled today by conventional thermocouples which need a direct contact with the curing composite surface and only provide a discrete measurement along the process. This solution for monitoring the temperature in some composite structures is complicated for complex portions in the structure and leaves room for improvement.

The aeronautical field is constantly upgrading quality control, mostly for improving production and safety, while reducing eventual wastes and re-working costs. Currently, once an aircraft enters in service and needs periodic inspection or experiences unscheduled events, operators have to disassemble the aircraft in order to encounter possible damage suffered by the adhesive lines of joints in composite structures. Existent inspections are acknowledged as a complex manual working process and unquestionably time consuming.

Nowadays, the adhesives lines in the composite structure undergo quality control made by Nondestructive Inspection (NDI) as, for example, an ultrasonic pulse echo method. Once the aircraft is brought to the ground, NDI controls need specific tools, certified inspectors, and access to the inspection area, which also imply an economic and schedule impact. Moreover, actual conventional procedure for monitoring temperature while manufacturing is known as dependent on the operator skills and requires a larger time investment.

There are known systems, like the one described in U.S. Pat. No. 8,812,251B2, for monitoring adhesive integrity within a cured bond line of a bonded structural assembly. So far, the adhesive lines are monitored using an electrical sensor network arranged inside the adhesive line. Furthermore, these systems for monitoring the adhesive state comprise an electrical power source for providing electrical power to the electrical sensor network in order to check on the adhesive line integrity on demand. The systems are made by interpreting changes directly measured within the cured bond line. However, such known devices and methods only provide monitoring once the adhesive lines have been manufactured, although do not provide monitoring in the course of manufacturing process.

There is further known in another technical field, optical fibers made of a plurality of cores located along the diameter of a cladding which can be manufactured to respond to either temperature or strain variations. These variations are commonly measured by selecting the optical fiber materials, especially core, cladding and coatings, but also the spacing and shape of the cores inside the fiber. Nowadays, temperature variations measured with optical fiber optimization can be provided over a large range.

Furthermore, there are known composite structures integrating an optical fiber capable of locating damage along the composite structures and also methods for manufacturing the composite structures integrating damage location capability. As well, there are known optical fiber connection devices providing optical alignment with minimum insertion losses that can be placed at any location of a composite surface in order to collect in-service parameters and continue to provide information from the connected optical fiber.

Accordingly, the present invention resolves a need in the prior art for an improved method that monitors the physical status of a bonded portion in an aeronautical composite structure where such an improved method provides manufacturing advantages over systems and methods known in the prior art. In addition, the present invention further provides a system for monitoring the temperature, strain or deformation during in-service inspection and in-service operation of a composite structure.

SUMMARY OF THE INVENTION

In a first inventive aspect, the invention provides an aeronautical composite structure comprising a bonded portion between structural components, this aeronautical composite structure further comprising:
- a multi-core optical fiber with at least two fiber cores, the multi-core optical fiber being integrated in the bonded portion along a longitudinal direction of this bonded portion, and comprising two fiber ends each coinciding with an end of the bonded portion, and
- at least one connector located on each fiber end and configured to connect each fiber to an interrogation unit for measuring at least one parameter of the bonded portion in the aeronautical composite structure,
- wherein each core of the multi-core optical fiber is configured to transmit predefined light pulses depending on the at least one parameter to be measured for monitoring the physical status of the bonded portion between structural components.

An aircraft is made up of a plurality of aeronautical composite structures formed by the joining of various structural components. For example, a torsion box for horizontal tail plane of an aircraft is formed, among other components, by structural components such as panels, stiffeners (i.e., stringers, ribs, . . . ), frames and skins, joined together so that for each joint, the configured composite structure comprises a bonded portion.

These bonded portions between structural components are critical joining portions in the composite structure whose physical state is of special interest to monitor. Especially, from the time the aeronautical composite structure is manufactured (i.e., assembling the structural components), until it is integrated in the aircraft, including also during the operational life of the aircraft.

The present invention provides an improved configuration for the joints between these structural components integrating an aeronautical composite structure in order to improve the monitoring of the physical state of these joints. Particularly, the present invention proposes the provision of at least an optical fiber integrated in a bonded portion of the composite structure corresponding to the joining portion between the structural components.

The optical fiber is a multi-core optical fiber comprising at least two fiber cores embedded within the fiber. The optical fiber is covered by a conventional cladding and comprises two fiber ends. The multi-core optical fiber is integrated in the bonded portion of the composite structure along a longitudinal direction of the same bonded portion. That is, this longitudinal direction corresponds to the direction that the bonded portion follows in the joint between structural components of the composite structure. The multi-core optical fiber is arranged along the entire length of the bonded portion so that the fiber ends of the optical fiber coincide with the end of the bonded portion.

The composite structure further comprises at least one connector that can connect each optical fiber, in their respective fiber ends, to an interrogation unit intended to monitor the physical status of the composite structure, especially in the bonded portion. More particularly, the connector is configured to connect each optical fiber core to an interrogation unit. This connector is a fan out with access to each fiber core of the multi-core optical fiber. The connector distributes the light from the optical fiber to each core of the multi-core optical fiber. The fact that the connector is connected to both ends of the optical fiber allows more flexibility in the application and the possibility of interrogating at both ends of the optical fiber. As well as the provision of the connector, both fiber ends further allow the fiber cores to be interrogated in order to measure physical parameters with technologies that require connecting at both fiber ends (e.g., Brillouin scattering).

Physical status must be understood in the context of the present invention as each one of the physically distinguishable situations or forms by measuring some properties that the composite structure can adopt in its temporal evolution. That is, in a bonded portion of a composite structure undergoing changes, a physical state is any of the possible situations as a result of these changes. Examples of such physical status of a composite structure are temperature, strain, deformation, damage, loads, vibrations and fire detection.

In particular, the provision of the connector connecting the fiber ends to the interrogation unit allows the measurement of at least one parameter of the bonded portion for monitoring the physical status of the composite structure. In such a way, the fiber cores integrated in the multi-core optical fiber transmit predefined light pulses, coming from the interrogation unit, along the optical fiber extension through the bonded portion. That is, depending on the parameter to be measured, the optical fiber transmits through the fiber cores predefined light pulses. Thus, by monitoring the measured parameter, the physical status of the composite structure in the bonded portion can be determined.

In another particular embodiment, the connector is a direct connector configured to be connected to a universal interrogator. This direct connector comprises a precise coping system of fiber cores that allows the alignment of all the fiber cores simultaneously with insertion and return loss values compatible with the dynamic ranges of each technology applied to the fiber cores. The universal interrogator is configured for interrogating all fiber cores with different technologies (e.g., FBG, Raman, Rayleigh or Brillouin).

The present invention advantageously allows the monitoring of the physical status of a bonded portion in a composite structure during the manufacturing process of the composite structure, during in-service inspection and during the operational life of the same.

Moreover, the presence of a plurality of cores in the optical fiber enables the selection and application of the optical monitoring technology of interest in each life step of the composite structure. That is, fiber cores could be intended to measure different parameters or the same parameter of interest about the bonded portion. This parameter can be temperature or strain or deformation or damage or loads or vibrations or fire detection.

Advantageously, the proposed solution aims to support and improve the control quality of the bonded portion during a curing process (step of manufacturing). Since the optical fiber is embedded inside a bonded portion of the composite structure, the measured temperature is more reliable than external sensors as in the prior art solutions. In addition, the optical fiber provision enables a measurement along the optical fiber length instead of discrete locations, as in the prior art solutions, and therefore, the control quality and temperature mapping can be done more extensively.

For structural tests or inspections and in-service operation, the optical fiber provision further enables the monitoring of structural performance by strain measurement and even monitoring the presence of damage on the bonded portion, such as disband. That is, the present invention allows detecting damage in the bonded portions without the need to condition the aircraft and provide access to the affected area on the composite structure.

Thus, the multi-core optical fiber acts as a permanent sensor installed inside the bonded portion between structural components, this optical fiber being interrogated according to the maintenance and operator requirements.

Accordantly, the present invention mainly provides the following advantages with respect to the conventional solutions:

improved quality control of the bonded portion between structural components by means of the multi-core optical fiber controlling much longer surfaces of the composite structure than prior art solutions.

monitoring of the temperature and strain on bonded portions during manufacturing. This also facilitates online inspection during manufacturing time and aims to detect possible defects bringing the possibility even to correct these defects before the manufacturing process is finished.

monitoring the in-service mechanical behavior by means of the provision of the optical fiber integrated in the bonded portion, thus allowing the control of this bonded portion and the detection of possible damage without the need to access the aircraft.

In a particular embodiment, the bonded portion comprises an adhesive line in which the at least multi-core optical fiber is embedded. This adhesive line corresponds to the joining means arranged between two structural components for their joint. In this embodiment, the optical fiber is embedded within the adhesive line. The use of integrated optical fiber in adhesive lines advantageously does not require drilling stiffeners for joints and therefore simplifies the manufacturing process and is advisable from a structural point of view.

The type of adhesive used for the adhesive lines depends on the working conditions, the application requirements and the materials to be joined. The working conditions and application requirements may be temperature ranges, dynamic or static load conditions, necessary chemical resistance, durability, application and curing times. The material to be joined to conform the composite structures are often metal, polymers or ceramic materials.

In a more particular embodiment, the adhesive line is an adhesive of epoxy. Epoxy is a preferable adhesive given that the material of the known aeronautical composite structure, needed resistances, temperature ranges and working times.

In other particular embodiments, the adhesive line is an adhesive of silicone, cyanoacrylate, polyurethane or phenolic.

In a particular embodiment, the bonded portion comprises a plurality of adhesive lines.

In a particular embodiment, the aeronautical composite structure comprises a plurality of multi-core optical fibers integrated in the bonded portion, wherein one of the connectors is located at a first multi-core optical fiber end and the other connector at a second multi-core optical fiber end.

Advantageously, the plurality of multi-core fibers provides a redundancy which offers possibilities of having back-up fibers in case of fiber failure. Additionally, with a plurality of multi-core fibers a higher number of parameters can be monitored simultaneously. In turn, the accuracy of measurement is also improved since a plurality of cores/fibers can be monitoring the same parameter.

In a particular embodiment, the multi-core optical fiber comprises a coating. The known optical fibers are covered by a cladding. Therefore, the mentioned coating is an additional covering to the cladding, and provides mechanical protection to the multi-core optical fiber.

The material of the coating depends on the working and temperature conditions of the optical fiber. For damage and temperature measurements, the material of the coating is polyamides. For fire detection, the material of the coating is metal. As well as for particular working conditions, the material of the coating may be a reinforced polymer. In a particular embodiment, the coating has a thickness greater than 200 µm.

In a particular embodiment, at least one core of the multi-core optical fiber is a multimode core configured to provide Raman scattering when the connectors are connected to the interrogation unit. The multimode core implies that the fiber is configured to spread several modes of light at once.

In a particular embodiment, at least one core of the multi-core optical fiber is a monomode core configured to provide Rayleigh scattering when the connectors are connected to the interrogation unit. The monomode core implies that the fiber can only spread one mode of light at a time.

In a particular embodiment, at least one core of the multi-core optical fiber is a monomode core comprising Bragg gratings. More particularly, the multi-core optical fiber may be a monomode core comprising multiplexed Bragg grating sensors.

In a particular embodiment, a multi-core optical fiber comprises a distribution of monomode cores wherein multiplexed Bragg granting sensors are written in the different cores of the multi-core optical fiber. Advantageously, the provision of multiplex Bragg granting sensors in the fiber cores allows matching multiples spatial resolution requirements over hundreds of meters of optical fiber while requiring the installation of one unique fiber.

Monomode and multimode fiber differ from each other in fiber core diameter, wavelength, light source, and bandwidth. The core diameter of monomode fiber is smaller than that of multimode fiber core. The wavelength of multimode fiber is less than that of monomode fiber. Additionally, multimode fiber bandwidth is limited by its source mode, while monomode fiber bandwidth is theoretically unlimited because it allows one mode light at a time to pass through. Moreover, monomode fiber is suitable for long distance applications, while multimode fiber is designed for short distances.

Given that the multi-core optical fiber integrates multiple cores (monomode and multimode) for a single optical fiber it is allowed:
to reduce and simplify the number of fibers to install, since a single optical fiber can include multiple cores and each core multiple or distributed sensors. This aspect is very important from the point of view of aircraft application, for example, in temperature measurement applications with a critical spatial resolution (around mm or cm) and requiring hundreds of meters throughout the entire plane, and in damage detection applications requiring damage detection resolutions around a few mm; and
to improve spatial resolution in those applications where there is a limitation in the distance between the end of the fiber.

Advantageously, the distribution of monomode cores inside the multi-core optical fiber provides consistency and uniformity of measured parameters along the entire monitored aeronautical composite structure.

In a particular embodiment, the aeronautical composite structure is a leading edge of a vertical tail plane, comprising as structural components:
an inner panel base laminate with a plurality of omega stringers, and
an outer panel,
at least the outer panel is joined to the inner panel base laminate by means of an adhesive line between one side of the outer panel and the head of each omega stringer, so that at least a multi-core optical fiber is embedded in the adhesive line.

In a more particular embodiment, each omega stringer is joined to the inner panel base laminate by means of an adhesive line arranged between one side of the inner panel base laminate and each foot of the omega stringers, so that at least a multi-core optical fiber is embedded in each one of the adhesive lines.

In a second inventive aspect, the present invention provides a system for monitoring the physical status of a bonded portion in an aeronautical composite structure, the system comprising:
an aeronautical composite structure according to the first inventive aspect, and
an interrogation unit connected to the connectors of the aeronautical composite structure and being configured to measure parameters in the bonded portion of the aeronautical composite structure for monitoring the physical status of the bonded portion.

That is, the main function of this interrogation unit is to interrogate the fiber integrated in the bonded portion between structural components to measure parameters of interest in order to determine the physical state of the bonded portion. The interrogation unit connected to the connectors of the composite structure allows monitoring the physical status of a bonded portion in a composite structure both in manufacturing and during operation life of the same structure.

In a more particular embodiment, the interrogation unit comprises:
- a light source configured to emit light pulses through a first fiber end of the multi-core optical fiber,
- a receiver configured to detect or sense the emitted light pulses through a second fiber end, and
- a processor configured to process the sensed light pulses.

The interrogation unit is in charge of interrogating the optical fiber through its ends, emitting light pulses by a light source and detecting these pulses by a receiver. Further, by means of this interrogation, a processor of the interrogation unit performs an analysis comparing the light pulses output (light pulses detected by the receiver) to the light pulses input (light pulses emitted by the light source).

Depending on the parameter to be measured (temperature, strain, deformation, damage, loads, vibrations and fire detection), the light pulses are configured with certain properties so that, based on the mentioned comparison analysis, the physical state of the bonded portion can be determined based on the parameter.

In a third inventive aspect, the present invention provides a method for monitoring the physical status of a bonded portion in an aeronautical composite structure according to the first inventive aspect, the method comprising the following steps:
- providing an interrogation unit,
- connecting the interrogation unit to the connector located on each multi-core optical fiber end of the aeronautical composite structure, and
- interrogating the multi-core optical fiber between connectors by transmitting through at least two cores of the multi-core optical fiber predefined light pulses depending on a parameter to be measured for monitoring the physical status of the bonded portion between structural components.

By means of the present method it is possible to monitor the physical status of bonded portions between components of an aeronautical composite structure both during the manufacture and the operational life of an aircraft on which the composite structures are installed.

In a particular embodiment, the step c) comprises:
- emitting, by a light source, predefined light pulses through at least one core of the multi-core optical fiber,
- measuring the received light pulses, and
- processing the measured light pulses for monitoring the physical status of the bonded portion in the aeronautical composite structure.

In a particular embodiment, the method further comprises monitoring the temperature in the bonded portion of the aeronautical composite structure, while this aeronautical composite structure is in a curing cycle process, measuring the temperature in this bonded portion by interrogating, in step c), the multi-core optical fiber.

In a particular embodiment, the method further comprises monitoring the damage in the bonded portion of the aeronautical composite structure measuring the strain or deformation in this bonded portion by interrogating, in step c), the multi-core optical fiber.

In a fourth inventive aspect, the present invention provides an aircraft comprising an aeronautical composite structure according to the first inventive aspect.

In a more particular embodiment, the aircraft comprises a plurality of aeronautical composite structures such as horizontal tail plane, vertical tail plane, and wings.

The provision of aircraft manufactured with aeronautical composite structures configured with multi-core optical fibers integrated on bonded portions of these structures, advantageously allows the monitoring of the status of these bonded portions through checks on the aircraft.

BRIEF DESCRIPTION OF THE DRAWINGS

These and other features and advantages of the invention will be seen more clearly from the following detailed description of a preferred embodiment provided only by way of illustrative and non-limiting example in reference to the attached drawings.

DETAILED DESCRIPTION OF THE PREFERRED EMBODIMENTS

As will be appreciated by one skilled in the art, aspects of the present invention may be embodied as an aeronautical composite structure, a system or a method for monitoring the physical status of a bonded portion of this aeronautical composite structure.

The present invention provides an aeronautical composite structure (1) with the provision of at least a multi-core optical fiber (6) integrated in a bonded portion (2) between structural components (3, 4, 5) of the aeronautical composite structure (1). This configuration of multi-core optical fiber (6) allows the monitoring of the physical status of the bonded portion (2) during the manufacture of the aeronautical composite structure, as well as during inspections once it is in-service.

Figure 1:
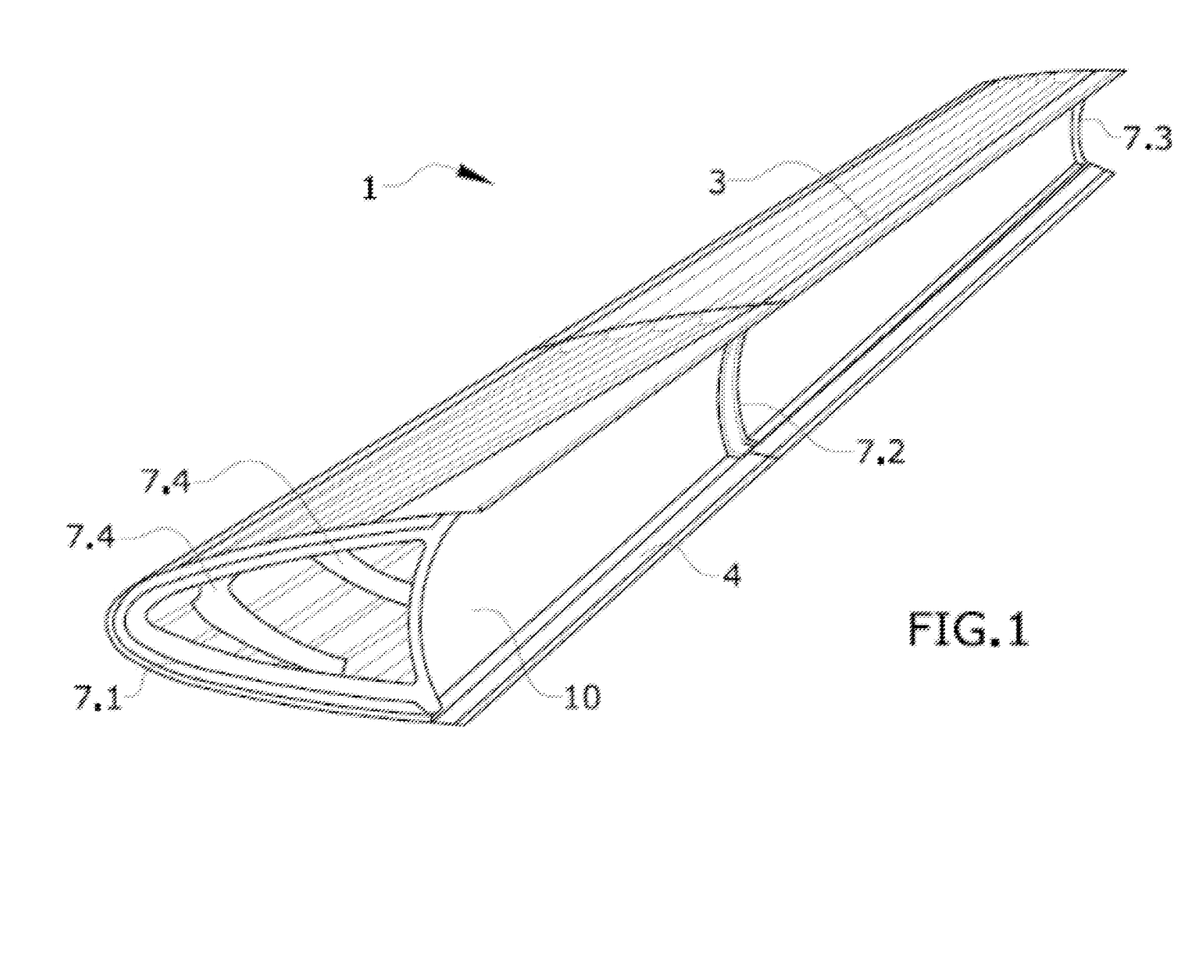
FIG. 1 shows a perspective view of an aeronautical composite structure according to an embodiment of the invention.

FIG. 1 shows a perspective view of an aeronautical composite structure (1) corresponding to a leading edge of a lifting surface as, for example, a horizontal tail plane. This leading edge (1) is formed by structural components as an inner panel base laminate (4) and a plurality of stringers (3). Particularly, the inner panel base (4) is mounted on a variety of ribs (7.1, 7.2, 7.3, 7.4) shaping the aeronautical composite structure or leading edge (1) as semi-ellipsoidal. The base of the leading edge (1) is covered by a membrane (10) made of composite materials.

More particularly, the leading edge (1) comprises two end ribs (7.1; 7.3) situated on both ends of the aeronautical composite structure (1), and an interface rib (7.2) located between both end ribs (7.1, 7.3). This interface rib (7.2)

provides a rigid connection between two portions of the standard sized inner panel base laminate (4) (as it is shown on FIG. 1). Furthermore, a plurality of stiffener ribs (7.4) placed on the inside of the inner panel base laminate (4) brings rigidity and shape retention of the laminate (4) in the leading edge (1).

Both of the portions of the inner panel base laminate (4) include omega stringers (3) which are located along the leading edge (1) and placed in parallel with each other along the surface of the laminate (4). Particularly, these omega stringers (3) are joined to the inner panel base laminate (4) by means of the adhesive line in a bonded portion (2) between inner panel laminate (4) and an outer panel (5) (shown in FIG. 2). This adhesive line (not shown in these FIGS. 1 and 2) is located between one side of the inner panel base laminate (4) and each foot of the omega stringers (3) in order to embed at least one multi-core optical fiber (6) in each of the bonded portions (2).

Figure 2:
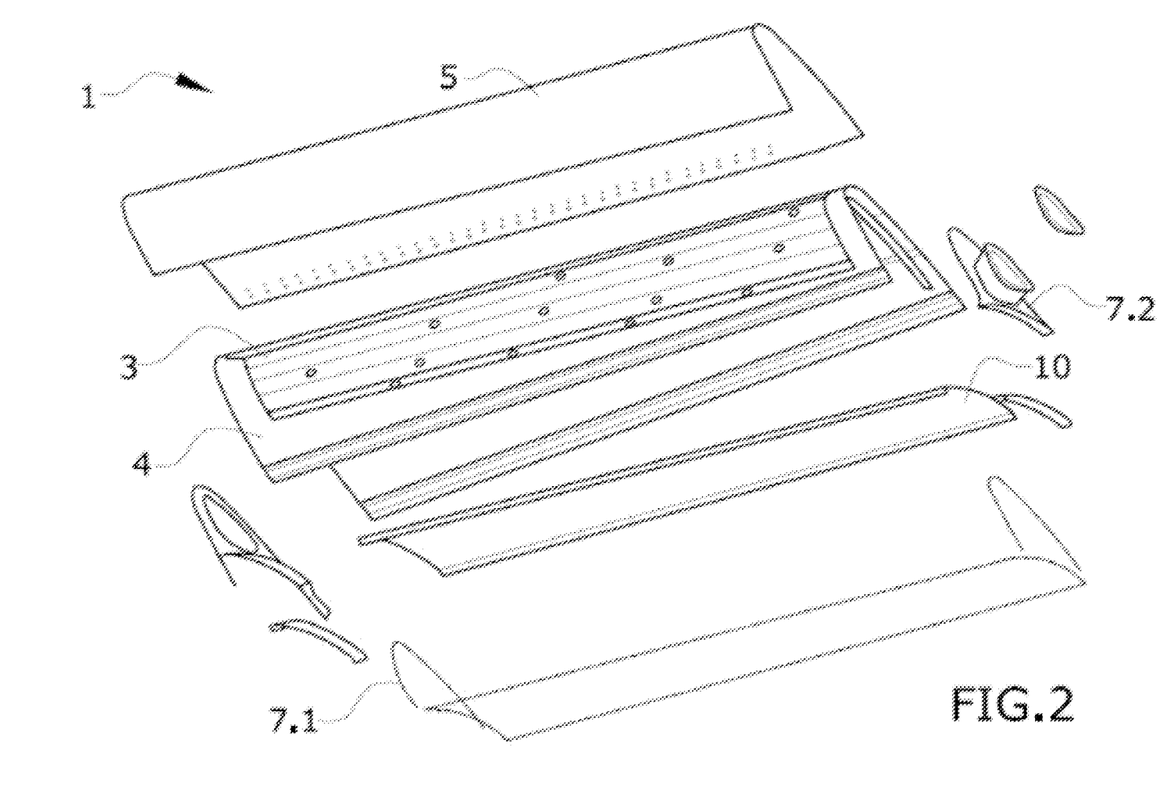
FIG. 2 shows an exploded view of the aeronautical composite structure shown on FIG. 1.

FIG. 2 shows an exploded view of the leading edge (1) of FIG. 1. More particularly, this FIG. 2 shows an outer panel (5) to be mounted on the inner panel base laminate (4) covering the whole inner panel base laminate (4). Specifically, as shown in FIG. 3, an adhesive line, to be placed on each of the plurality of omega stringers (3), joins the mentioned outer panel (5) to the inner panel base laminate (4) providing resistance and fixation to the structural components of the leading edge (1).

In a preferred embodiment, the adhesive lines, such as adhesives made of an epoxy resin, silicone, cyanoacrylates, polyurethanes, phenolitics, etc., are used depending on the type of materials to assemble.

Figure 3:
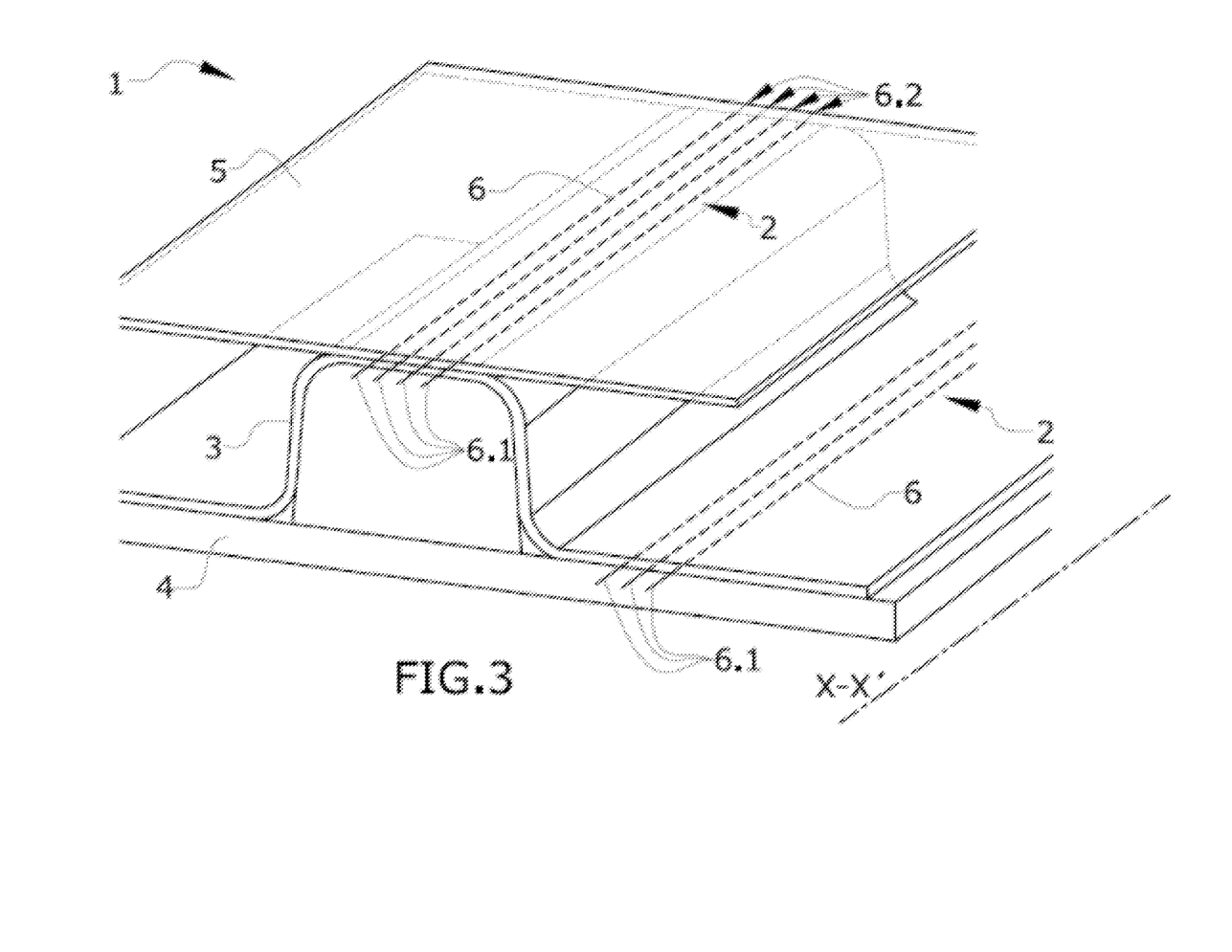
FIG. 3 shows a perspective view of a bonded portion of an aeronautical composite structure according to an embodiment of the present invention.

FIG. 3 shows a perspective view of a portion of an aeronautical composite structure (1) (as the structure shown on FIG. 2) with an inner panel base laminate (4), an omega stringer (3) and an outer panel (5). The omega stringer (3) is attached to the inner panel base laminate (4), at one of the feet of the omega stringer (3), on a portion identified as bonded portion (2). Additionally, the outer panel (5) is attached to the head of the omega stringer (3), specifically on its outer surface, on a portion also identified as a bonded portion (2). These bonded portions (2) are arranged along a longitudinal direction (X-X'). The contact between the structural components (3, 4, 5) in these bonded portions (2) is secured via an adhesive line of a predetermined bonding width. Along each bonded portion (2) a plurality of multi-core optical fibers (6) is integrated. Each multi-core optical fiber (6) includes two fiber ends (6.1; 6.2) at each of the extremity of the multi-core optical fibers (6) coinciding with the end of the bonded portions (2) respectively.

Each fiber end (6.1; 6.2) presents a connector (not shown in the figures) to connect the fibers (6) to an interrogation unit (not shown in the figures) for measuring parameters of the bonded portion (2), such as temperature, deformation or strain, in the aeronautical composite structure (1). Each of the multi-core optical fibers (6) comprises at least two fiber cores (9) which transmit predefined light pulses depending on a previously set parameter to be measured for monitoring the physical status of the bonded portion (2).

In a particular example, the interrogation unit (18) emits light pulses through the multi-core optical fibers (6), from a first fiber end (6.1), by means of a light source (not shown in the figures). This light emitted is then detected at a second fiber end (6.2) by means of a receiver of the interrogation unit (18). Once the emitted light pulse is sensed, this sensed light pulse is processed by means of a processor comprised in the interrogation unit (18).

In a particular example, the multi-core optical fiber (6) comprises at least two cores (9) integrated inside a cladding (11), preferably spaced at intervals of 35 to 70 microns.

Figure 4A:
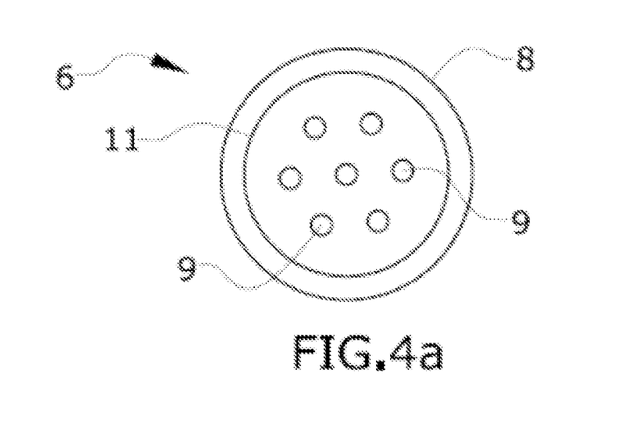
FIGS. 4a-4c show a cross sectional view of a multi-core optical fiber according to an embodiment of the present invention.
Figure 4B:
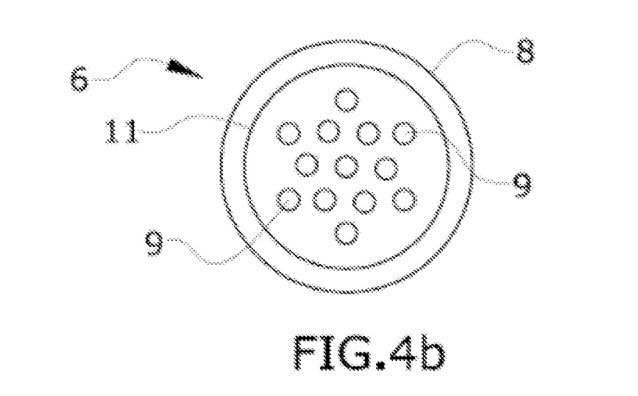
Figure 4C:
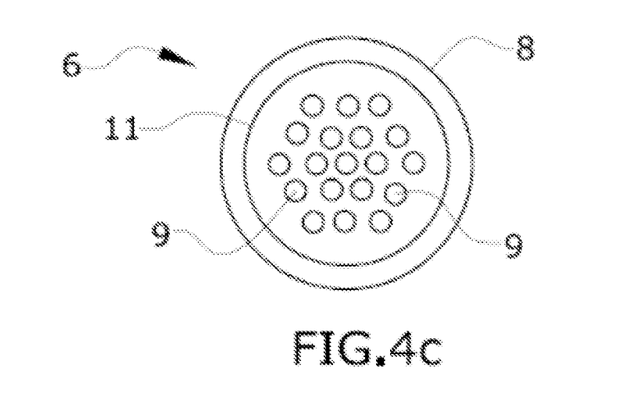

FIGS. 4a-4c show cross sectional views of multi-core optical fibers (6) wherein the arrangement structure of the cores (9) inside a multi-core optical fiber (6) are star shaped (FIG. 4b) or hexagonally shaped (FIGS. 4a and 4c). More precisely, one of a multi-core optical fiber (6) includes seven cores (9) (FIG. 4a), thirteen cores (9) (FIG. 4b) and nineteen cores (9) (FIG. 4c).

FIGS. 4a-4c further show a multi-core optical fiber (6) covered, in addition to the cladding (11), by a coating (8) which provides mechanical protection to the multi-core optical fiber (6). In a particular example, the coating (8) is made of polyamide for temperature and deformation measurements, metallic for fire detection and reinforced polymers for further determined measurements.

One core (9) can either be monomode, in order to perform either Bragg, Brillouin or Rayleigh scattering, or multimode, in order to perform Raman scattering. In a preferred example, each multi-core optical fiber (6) comprises at least a core of each type. Such preferred structure provides, on one hand, reduction and simplification of the substance core (9) number while manufacturing the multi-core optical fiber (6). On the other hand, the preferred structure also improves the spatial resolution to reduce distance between sensors of a multi-core optical fiber (6) on the aeronautical composite structure (1).

In further preferred embodiments, at least one multi-mode core (9) of the multi-core optical fiber (6) is integrated for providing Raman scattering while being connected to the interrogation unit (18). Furthermore, at least one monomode core (9) of the multi-core optical fiber (6) is provided for providing Rayleigh scattering while being connected to the interrogation unit (18). Finally, at least one monomode core (9) of the multi-core optical fiber (6) is integrated for performing Bragg grating sensing measurements.

Figure 5:
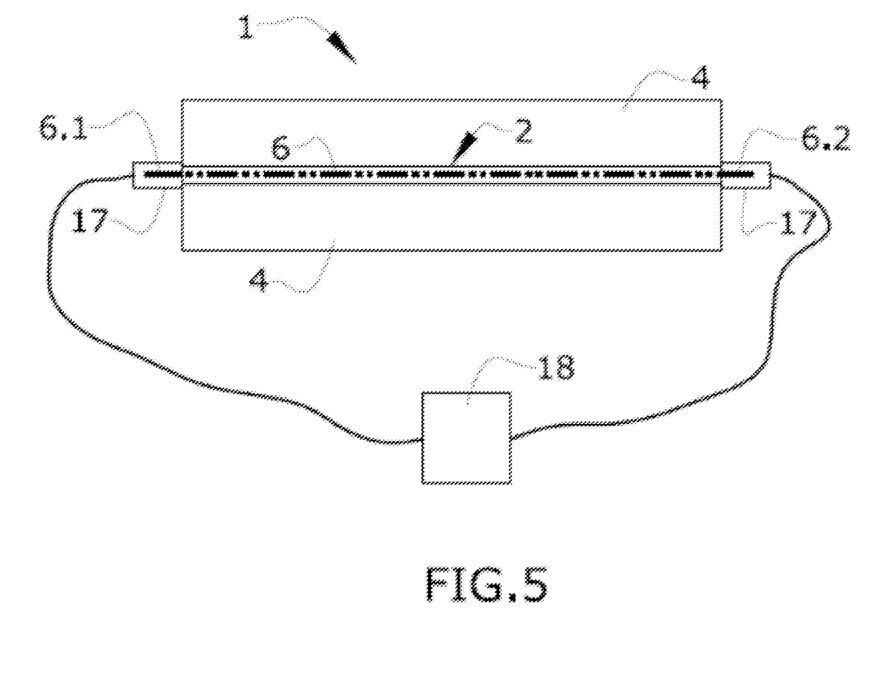
FIG. 5 shows a schematic view of a monitoring system according to an embodiment of the present invention.

FIG. 5 shows a system for monitoring the physical status of a bonded portion (2) in an aeronautical composite structure (1). A multi-core optical fiber (6) is embedded in the bonded portion (2) between structural components (4) that corresponds to panel laminate bases of the composite structure (1). This system further comprises an interrogation unit (18) connected to the multi-core optical fiber (6) by means of connectors (17). In particular, each connector (17) is attached to each fiber end (6.1, 6.2) allowing the connection between the interrogation unit (18) and both fiber ends (6.1, 6.2) of the multi-core optical fiber (6). The interrogation unit (18) transmits predefined light pulses through at least two cores (9) of the multi-core optical fiber (6) depending on the parameter to be measured for monitoring the physical status of the bonded portion (2) between both panel laminate bases (4).

Figure 6:
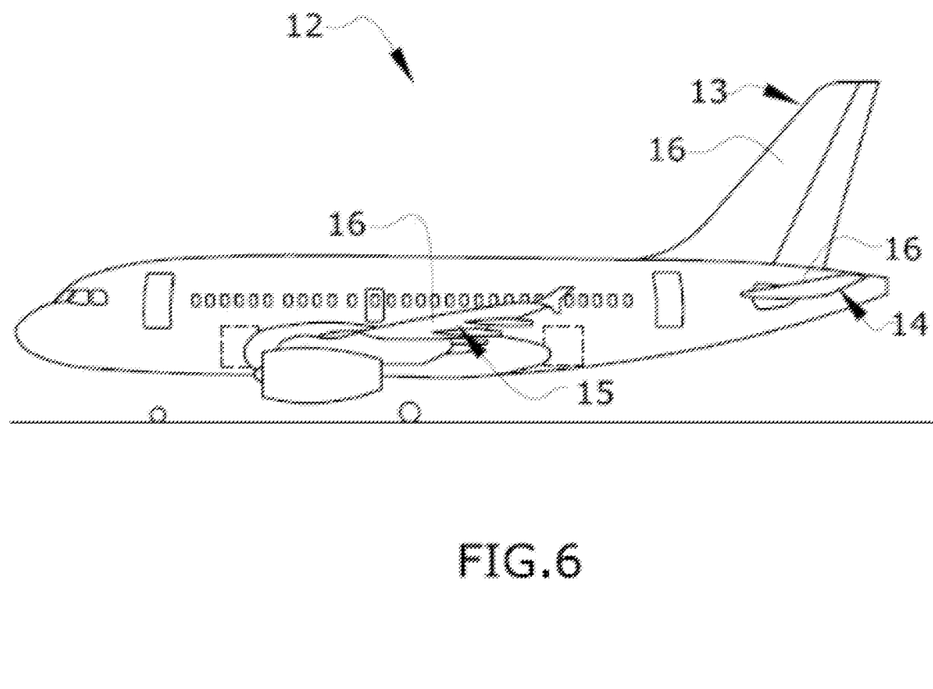
FIG. 6 shows a side view of an aircraft comprising aeronautical composite structures according to embodiments of the present invention.

FIG. 6 shows a side view of an aircraft (12) comprising a vertical tail plane (13), a horizontal tail plane (14) and a wing (15), all of these structures being aeronautical composite structures (1) according to an embodiment of the invention. Each tail plane (13, 14) and wing (15) present a leading edge (16) comprising a multi-core optical fiber (6) integrated on bonded portions (2) for providing an ability to measure a physical status of a structure. The leading edge (16) is the first component of each aeronautical composite structure (1) coming in contact with the oncoming airflow while the aircraft (12) is in-service.

Method for monitoring the physical status of a bonded portion (2) in an aeronautical composite structure (1)

The present invention further provides a method for monitoring the physical status of a bonded portion (2) in an aeronautical composite structure (1) such as, for example, the vertical tail plane shown in FIGS. 1 and 2.

This monitoring method comprises the following steps:
providing an interrogation unit (18),
connecting the interrogation unit (18) to the connector located on each multi-core optical fiber end (6.1, 6.2) of the aeronautical composite structure (1), and
interrogating the multi-core optical fiber (6) between connectors (17) by transmitting through at least two cores (9) of the multi-core optical fiber (6) predefined light pulses depending on a parameter to be measured for monitoring the physical status of the bonded portion (2) between structural components (3, 4, 5).

Starting from the composite structure (1) object to be monitored either during its manufacture or once it is already manufactured and/or installed on an aircraft (12), the interrogation unit (18) provided in step a) is then connected in step b) to the connectors (17) on each of the fiber ends (6.1, 6.2). These fiber ends (6.1, 6.2) correspond to the ends of the multi-core optical fibers (6) embedded in each bonded portion (2) of the composite structure (1). The monitoring is independently performed for each bonded portion (2) of the composite structure (1).

Once the connectors (17) of the multi-core optical fiber (6) are connected to the interrogation unit (18), step c) begins with the interrogation of the multi-core optical fiber (6). For this step c), predefined light pulses are emitted through the optical fibers depending on the parameter to be measured on the bonded portion (2). This parameter may be temperature, strain, deformation, damage, loads, vibrations and fire detection. Therefore, the light pulses are configured with properties based on the parameter to be measured.

Once the light pulses are already set, then a light source emits in step i) these light pulses through the optical fibers, integrated on the bonded portion (2), in order to be sensed in step ii) by a receiver. Both the light source and receiver are contained in the interrogation unit (18).

The light pulses already sensed are processed in step iii) by a processor also comprised in the interrogation unit (18). The processor compares the light pulses output corresponding to the light pulses detected by the receiver with the light pulses input corresponding to the light pulses emitted by the light source. Based on this light pulse comparison, the processor is able to determine the physical state of the adhesive line (2) in the composite structure (1). Therefore, by means of this comparative analysis, the present method allows the monitoring of the physical status of the bonded portions (2) in an aeronautical composite structure (1). Following the parameters intended to be measured in the bonded portion (2), the at least one multi-mode core (9) of the multi-core optical fiber (6) is integrated to perform, in a particular example, Raman scattering Raman scattering is an inelastic process caused by molecular vibrations. The incident light is scattered in two components, Stokes at a higher wavelength and anti-Stokes at a lower wavelength. The ratio between the anti-Stokes and the Stokes light intensity is a direct measurement of the temperature. The Raman scattering components are compared in different timestamps across light's direction inside the multi-mode core (9) of the multi-core optical fiber (6) while being connected to the interrogation unit (18).

In another particular example, at least one multi-mode core (9) of the multi-core optical fiber (6) is integrated to perform Rayleigh scattering. It is an elastic scattering in which the frequency of scattered light remains unchanged respect to the input light. Analysis and correlation of the variation of the backscattering in different stages are tracked over the core of the multi-core optical fiber (6). As a result, temperature and/or strain can be monitored.

In another example, at least one, but preferably more than one, mono-mode core (9) of the multi-core optical fiber (6) comprises multiplexed Bragg grating sensors. Variations in the reflected wavelengths are detected by the interrogation unit (18) when strain is applied or temperature changes are identified on the multi-core optical fiber (6).

Additionally, the monitoring and comparison of the engineering parameters measured by each core of a multi-core fiber enable the improvement of the accuracy on the individual engineering parameters such as temperature or strain, and hence it enhances the compensation and isolation of coupled effects in the measurement of a unique parameter.

For example, in a manufacturing process of an aeronautical composite structure (1), it is of interest to monitor the temperature of bonded portions (2) when the composite structure is in a curing cycle. The system of the invention allows the interrogation of the multi-core optical-fibers (6) integrated on each bonded portion (2) for determining the temperature on them.

On another example, during the operational life of an aircraft (12) that has several composite structures (1), it is of interest to determine possible damage in bonded portions (2). For this, the bonded portions (2) are interrogated through the multi-core optical-fibers (6) for measuring the strain or deformation in these bonded portions (2).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aeronautical composite structure comprising a bonded portion between structural components, this aeronautical composite structure further comprising:
a multi-core optical fiber with at least two fiber cores, the multi-core optical fiber being integrated in the bonded portion along a longitudinal direction of this bonded portion, and comprising two fiber ends each coinciding with an end of the bonded portion, and
at least one connector located on each fiber end and configured to connect each fiber to an interrogation unit for measuring at least one parameter of the bonded portion in the aeronautical composite structure,
wherein, each core of the multi-core optical fiber is configured to transmit predefined light pulses depending on the at least one parameter to be measured for monitoring a physical status of the bonded portion between structural components.

2. The aeronautical composite structure according to claim 1, wherein the bonded portion comprises an adhesive line in which the multi-core optical fiber is embedded.

3. The aeronautical composite structure according to claim 1, further comprising a plurality of multi-core optical fibers integrated in the bonded portion, wherein one of the connectors is located at a first multi-core optical fiber end and the other connector at a second multi-core optical fiber end.

4. The aeronautical composite structure according to claim 1, wherein at least one core of the multi-core optical fiber is a multimode core configured to provide Raman scattering when the connectors are connected to the interrogation unit.

5. The aeronautical composite structure according to claim 1, wherein at least one core of the multi-core optical fiber is a monomode core configured to provide Rayleigh scattering when the connectors are connected to the interrogation unit.

6. The aeronautical composite structure according to claim 1, wherein at least one core of the multi-core optical fiber is a monomode core comprising Bragg gratings.

7. The aeronautical composite structure according to claim 1, wherein a multi-core optical fiber comprises a distribution of monomode cores wherein multiplexed Bragg grating sensors are written in different ones of the cores of the multi-core optical fiber.

8. The aeronautical composite structure according to claim 1, wherein the aeronautical composite structure is a leading edge of a vertical tail plane comprising as structural components:
   an inner panel base laminate with a plurality of omega stringers, and an outer panel,
   at least the outer panel is joined to the inner panel base laminate by means of an adhesive line between one side of the outer panel and a head of each omega stringers, so that at least a multi-core optical fiber is embedded in said adhesive line.

9. The aeronautical composite structure according to claim 8, wherein each omega stringer is joined to the inner panel base laminate by an adhesive line arranged between one side of the inner panel base laminate and each foot of the omega stringers, so that at least a multi-core optical fiber is embedded in each one of said adhesive lines.

10. A system for monitoring a physical status of a bonded portion in an aeronautical composite structure, the system comprising:
   an aeronautical composite structure according to claim 1, and
   an interrogation unit connected to the connectors of the aeronautical composite structure and being configured to measure at least one parameter in the bonded portion of the aeronautical composite structure for monitoring the physical status of the bonded portion.

11. A method for monitoring the physical status of a bonded portion in an aeronautical composite structure according to claim 1, the method comprising the following steps:
   providing an interrogation unit,
   connecting the interrogation unit to the connector located on each multi-core optical fiber end of the aeronautical composite structure, and
   interrogating the multi-core optical fiber between connectors by transmitting through at least two cores of the multi-core optical fiber predefined light pulses depending on a parameter to be measured for monitoring a physical status of the bonded portion between structural components.

12. The method according to claim 11, wherein the step of interrogating comprises:
   emitting, by a light source, predefined light pulses through at least one core of the multi-core optical fiber,
   measuring received light pulses, and
   processing the measured light pulses for monitoring a physical status of the bonded portion in the aeronautical composite structure.

13. The method according to claim 11, further comprising monitoring a temperature in the bonded portion of the aeronautical composite structure, while the aeronautical composite structure is in a curing cycle process, measuring the temperature in this bonded portion by interrogating, in the step of interrogating, the multi-core optical fiber.

14. The method according to claim 11, further comprising monitoring damage in the bonded portion of the aeronautical composite structure by measuring a strain or deformation in the bonded portion by interrogating, in the interrogating step, the multi-core optical fiber.

15. An aircraft comprising an aeronautical composite structure according to claim 1.

\* \* \* \* \*